United States Patent
Cheng

(10) Patent No.: US 7,146,393 B2
(45) Date of Patent: Dec. 5, 2006

(54) SCALING METHOD BY USING CUBIC-LIKE TRIPLE POINT SLOP CONTROL (CTPSC)

(75) Inventor: Kun-Nan Cheng, Hsinchu (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 730 days.

(21) Appl. No.: 10/364,776

(22) Filed: Feb. 10, 2003

(65) Prior Publication Data

US 2003/0187892 A1   Oct. 2, 2003

Related U.S. Application Data

(60) Provisional application No. 60/369,522, filed on Apr. 1, 2002.

(51) Int. Cl.
*G06F 7/38* (2006.01)

(52) U.S. Cl. .................................................. 708/290

(58) Field of Classification Search ................ 708/290
See application file for complete search history.

(56) References Cited

U.S. PATENT DOCUMENTS

| | | | |
|---|---|---|---|
| 5,379,241 A | 1/1995 | Greggain | |
| 5,502,662 A | 3/1996 | Greggain | |
| 6,539,128 B1* | 3/2003 | Lee et al. | 382/300 |
| 6,735,608 B1* | 5/2004 | Koyanagi et al. | 708/290 |
| 7,015,936 B1* | 3/2006 | Cheng | 345/660 |
| 2003/0187891 A1* | 10/2003 | Cheng | 708/290 |
| 2003/0195908 A1* | 10/2003 | Cheng | 708/290 |

* cited by examiner

*Primary Examiner*—Tan V. Mai
(74) *Attorney, Agent, or Firm*—J.C. Patents

(57) ABSTRACT

A scaling method is to scale source data to destination data, wherein three reference points of the source data denoted as −1, 0, and 1. Function $f(x)=ax^2+bx+c$ are used to describe the destination data within 0 and 1. The method includes setting a midpoint 0.5 with a quantity of $f(0.5)=[f(0)+f(1)]/2$ and $f'(0)=f'(1)=DG$; wherein D is a slope of $[2f(0)-f(-1)-f(1)]$, and G is a gain factor to adjust the slope. Curve $f(x)$ passes through the points of 0, 0.5, and 1. The coefficients of a, b, and c for $f(x)$ are solved by a range of $0 \leq x < 0.5$ and a range of $0.5 \leq x < 1$, so that the $f(x)$ is symmetric or substantially symmetric to the midpoint Curve is set to have:

$f(x)=2[f(1)-f(0)-DG]x^2+(DG)x+f(0)$ for $0 \leq x < 0.5$;
and $f(x)=2[DG+f(0)-f(1)]x^2+[4f(1)-4f(0)-3DG]x+[DG-f(1)+2f(0)]$ for $0.5 \leq x < 1$.

13 Claims, 6 Drawing Sheets

SCALING METHOD BY USING CUBIC-LIKE TRIPLE POINT SLOP CONTROL (CTPSC)

CROSS-REFERENCE TO RELATED APPLICATION

This application claims the priority benefit of U.S. provisional application titled "TRIPLE POINTS SYMMETRICAL CUBIC-LIKE SLOP CONTROL (TPSCSC) SCALING" filed on Apr. 1, 2002, Ser. No. 60/369,522. All disclosures of this application is incorporated herein by reference.

BACKGROUND OF THE INVENTION

1. Field of the Invention

The present invention relates to a method of data scaling, and more particularly to a method of scaling up or down of different types of data such as graphics, image, video or audio data, and for application of polygon curve fitting in many areas such as object moving tracking analysis, data analysis, a finder for objects of 2D shape or 3D surface in graphic areas.

2. Description of Related Art

Scaling is useful for operations in graphics, image, video or audio application for expanding or shrinking sample resolution and for zooming. Especially in digital display devices with fixed resolution, different kinds of source image formats must be scaled to fit the required resolution of the digital display.

For example, a display panel may have a resolution of 1024×768 pixels in XGA mode, but the source image may be provided from computer, video decoder, or others that may have input resolution different from the display panel depending on the input modes. The input source in VGA mode (640×480 pixels) with resolution less that that of display mode XGA needs to be scaled up when displayed on the XGA panel. On the other hand, an input source in SXGA mode (1280×1024 pixels) with resolution greater than that of display mode XGA needs to be scaled down when displayed on the XGA panel. Image resizing is very important for digital display devices such as LCD. Various well-known conventional methods, such as Bilinear, Cubic, B-Spline, Bésier have been proposed in order to achieve a good filtering effect for scaling uses.

The Bilinear method is the most commonly used method using interpolation. Its advantages are its simplicity, speed, and cost since only two reference points are taken. As a result, the cost of the implementation of the Bilinear method is low because computation and storage requirements are less compared with other high-order interpolation methods. However, the output of the Bilinear method is blurry due to lack of sharpness from the interpolation results and is, therefore. not suitable for use in text image. The sharpness of the picture quality depends on the curve after fitting the interpolation points. The Bilinear method takes the weighting average as the interpolation result. When considering two neighboring pixels A, B, if the interpolation point C is located between A and B with distance D (D≦1) from A, then the interpolation result, according to the Bilinear method, is $$C=A(1-D)+B\,D \qquad \text{Eq. 1}$$

In this manner, even though the interpolation form is simple, the quality is poor.

Cubic or B-Spline methods are the more preferred methods used in high quality scaling system with almost perfect scaling quality, but the cost is very high for computation and storage. Cubic methods usually require 4 points f(−1), f(0), f(1), and f(2) as reference. The Cubic Curve using the Hermite Method has one start point $P_1$, one end point $P_2$, one start point tangent-vector $R_1$, and one end point tangent-vector $R_2$ by the formula $$f(x) = (2x^3 - 3x^2 + 1)P_1 + (-2x^3 + 3x^2)P_2 + (x^3 - 2x^2 + x)R_1 + (x^3 - x^2)R_2 \quad \text{Eq.2}$$

$$= (2P_1 - 2P_2 + R_1 + R_2)x^3 + (-3P_1 + 3P_2 - 2R_1 - R_2)x^2 + R_1 x + P_1 \quad \text{Eq.3}$$

where $P_1=f(0)$, $P_2=f(1)$ $R_1=G_1(P_2-P_0)/2=G_1[f(1)-f(-1)]/2$=tangent-vector at P1

$R_2=G_2(P_3-P_1)/2=G_2[f(2)-f(0)]/2$=tangent-vector at P2

$G_1$, $G_2$ are gain factors, wherein gain factor is proportional to the sharpness of the scaling result.

En the foregoing conventional methods, Bilinear method can be easily implemented. However, the interpolation result depends on quantities of only two points. When the change of quantity at certain ranging has a large variation, the image after scaling would lose fidelity. For the Cubic or B-Spline methods, more information is included, but its implementation would be more complex, the cost is high and the computation is more tedious. So, the foregoing conventional methods still have their disadvantages.

SUMMARY OF THE INVENTION

The present invention provides a low cost and high performance cubic-like scaling algorithm of triple point slope control (CTPSC) for both shrinking and zooming purposes with a second order equation. The quality of the CTPSC method can be compared with the Cubic or B-Spline methods, while keeping the cost approximately equal to that of the Bilinear method. The CTPSC method of the present invention requires only three reference source points for generating interpolation points with high quality and a much lower storage requirement comparing to that of Cubic or B-Spline methods. Therefore, the cost of storage and implementation is also reduced. Each piece of destination data can be generated with three reference source points. A slope control is used to control the sharpness of the interpolation result. The interpolation curve passes the source sample points and the interpolation points to generate destination data for display. The interpolation curve passes a start point of the source sample point, with a start point slope $S_1$ defined by three source points. Also, the curve passes through the midpoints of two neighboring points, and then ends at the end point of the two neighboring points with an end point slope $S_2$, equal to the slope $S_1$ of the start point. A slope gain G is used to adjust the slope D. As a result, different start point slope gain DG affects the scaling quality, wherein the gain G preferably is 0.5.

A scaling method is to scale source data to destination data, wherein three reference points of the source data denoted as −1, 0, and 1. Function $f(x)=ax^2+bx+c$ is used to describe the destination data within 0 and 1. The method includes setting a midpoint 0.5 with a quantity of $f(0.5)=[f(0)+f(1)]/2$ and $f'(0)=f'(1)=DG$, wherein D is a slope of $[2f(0)-f(-1)-f(1)]$, and G is a gain factor to adjust the slope. Curve $f(x)$ passes through the points of 0, 0.5, and 1. The coefficients of a, b, and c for $f(x)$ are solved by a range of $0 \leq x < 0.5$ and a range of $0.5 \leq x < 1$, so that the $f(x)$ is symmetric or substantially symmetric to the midpoint. Curve is set to have $$f(x)=2[f(1)-f(0)-DG]x^2+(DG)x+f(0) \text{ for } 0 \leq x < 0.5;$$
and
$$f(x)=2[DG+f(0)-f(1)]x^2+[4f(1)-4f(0)-3DG]x+[DG-f(1)+2f(0)] \text{ for } 0.5 \leq x < 1.$$

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIEMENTS

The theory employed by the present invention is described in the following mathematical equations using calculations with a general understanding of simple algebra and calculus.

For a given quadratic function $$f(x)=ax^2+bx+c \qquad \text{Eq. 4}$$

its first differential equation is known as $$f'(x)=2ax+b. \qquad \text{Eq. 5}$$

If the quantities of f(−1), f(0), and f(1) as the source image reference points are known, the curve passes the f(0), f(1), midpoint f(0.5), with a condition of a start point slope f'(0) and an end point slope f'(1) by f'(0)=f'(1). So, some quantities are defined as follows:

$$M \text{ midpoint}=f(0.5)=0.5[f(0)+f(1)] \qquad \text{Eq. 6}$$

$$D \text{ terminal points slope}=f'(0)=f'(1)=2f(0)-f(-1)-f(1) \qquad \text{Eq. 7}$$

$$G \text{ gain factor, } G \geq 0. \qquad \text{Eq. 8}$$

Typically, the gain factor G is used to adjust the slope D. The initial conditions are set as follows:

$$f'(0)=f'(1)=DG=D \text{ Gain} \qquad \text{Eq. 9}$$

for $0 \leq x < 0.5$: using f(0), D, M $$f(0)=c, \qquad \text{Eq. 10}$$

$$f'(0)=b=[2f(0)-f(-1)-f(1)]G=DG \qquad \text{Eq. 11}$$

$$f(0.5)=0.25a+0.5b+c=0.5[f(0)+f(1)]=M \qquad \text{(Eq. 12)}$$

for $0.5 \leq x < 1$: using f(1), D, M $$f(1)=a+b+c, \qquad \text{Eq. 13}$$

$$f'(1)=2a+b=[2f(0)-f(-1)-f(1)]G=DG \qquad \text{Eq. 14}$$

$$f(0.5)=0.25a+0.5b+c=0.5[f(0)+f(1)]=M \qquad \text{Eq. 15}$$

then the solutions of the coefficients of a, b, and c for f(x) can be obtained.

For $0 \leq x < 0.5$, $$f(x)=2[f(1)-f(0)-DG]x^2+(DG)x+f(0), \qquad \text{Eq. 16}$$

and for $0.5 \leq x < 1$, $$f(x)=2[DG+f(0)-f(1)]x^2+[4f(1)-4f(0)-3DG]x+[DG-f(1)+2f(0)]. \qquad \text{Eq. 17}$$

Figure 1:
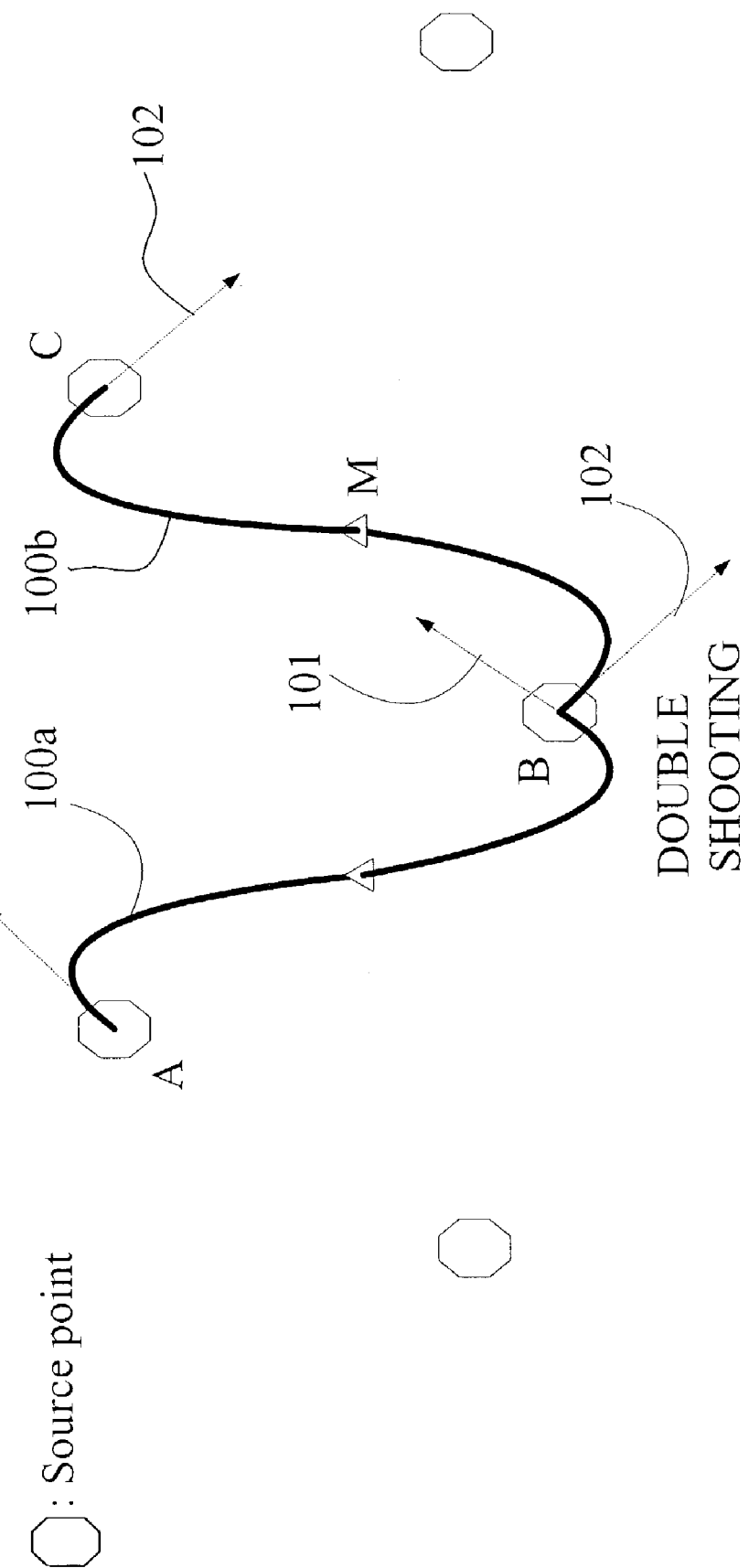
FIG. 1 is an application of the CTPSC scaling method of present invention.

FIG. 1 is the curve resulting from the CTPSC scaling of the present invention. Three reference source points A, B, and C are with respect to the quantities of f(−1), f(0), and f(1) at the reference source points −1, 0, +1, wherein a point M is the midpoint between the start point B and the end point C by f(0.5)=[f(0)+f(1)]/2. The range between points 0 and 1 is considered as a current processing range. Curve 100, which passes through the reference source points at 0, 0.5, and 1, is the curve produced by using the CTPSC method of the present invention. The arrows 101 and 102 are the slopes at point B, due to double shooting at point B. Wherein, the slope 101 is used for fitting the curve 100a between point A and B, and the slope 102 is used for fitting the curve 100b between the points B and C. The slope f'(0) is set to be equal to f'(1). Point M at x=0.5 is the midpoint between point B and C. Double shooting is present at point B because the curve from points A to B to C is a boundary of an object Furthermore, double shooting will result in an edge enhancement on both sides of the edges, which allows the curve to possess the characteristics of a cubic curve when scaling.

The advantages of the CTPSC method of the present invention is low-cost, simplicity, and little quality loss compared to other high-order (3'rd or more) interpolation methods. The present invention uses three samples f(−1), f(0), f(1) to get a sharper scaling result than that of the Bilinear method with the edge enhancement result comparable to that of the Cubic method.

Figure 2:
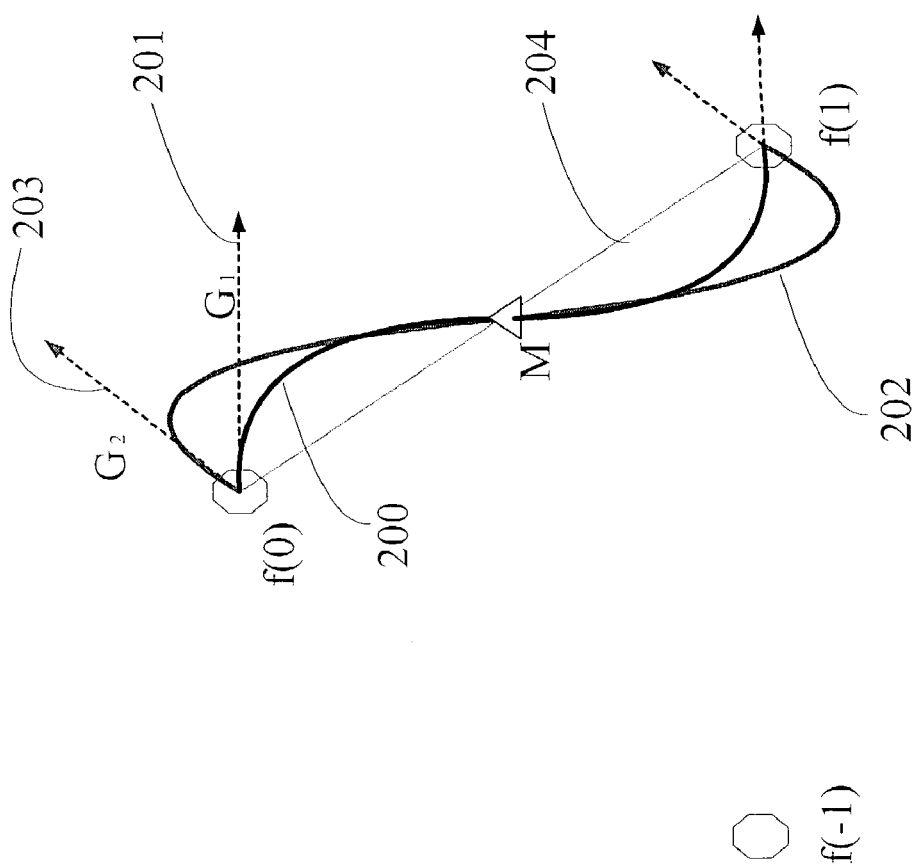
FIG. 2 is a behavior of CTPSC scaling method with different gain of slope at the start source point of the present invention.

FIG. 2 shows the behavior of the CTPSC scaling method with different gain of slope at the start source point. Curve 204 is a Bilinear curve shown for comparison. Curve 200 uses the CTPSC method with a gain factor $G_1$ 201 at points f(0) and f(1) and curve 202 uses the CTPSC method with another gain factor $G_2$ 203 at points f(0) and f(1). The gain factor $G_1$ 201 is equal to 0 and the gain factor $G_2$ 203 is $0 < G_2 < 1$ which makes the two curves 200 and 202 significantly different. The gain factor G is used to adjust the curve to match desired quality. The gain factor G should be $\geq 0$, and $G \neq 1$, where the slope is $DG = f'(0) = f'(1) = [2f(0) - f(-1) - f(1)]G$, for $0 \leq x < 1$. The gain factor G affects the quality and $0.5 \geq G \geq 0$ is preferable for scaling purposes. The fitting curves of $0 \leq x < 0.5$ and $0.5 \leq x < 1$ are symmetrical to the midpoint f(0.5). The gain factor G is important for the curve between $0 \leq x < 1$, because the gain factor G affects the curve smooth. For high performance applications, G is selected $\leq 0.5$ where smaller values are preferable.

Figure 3:
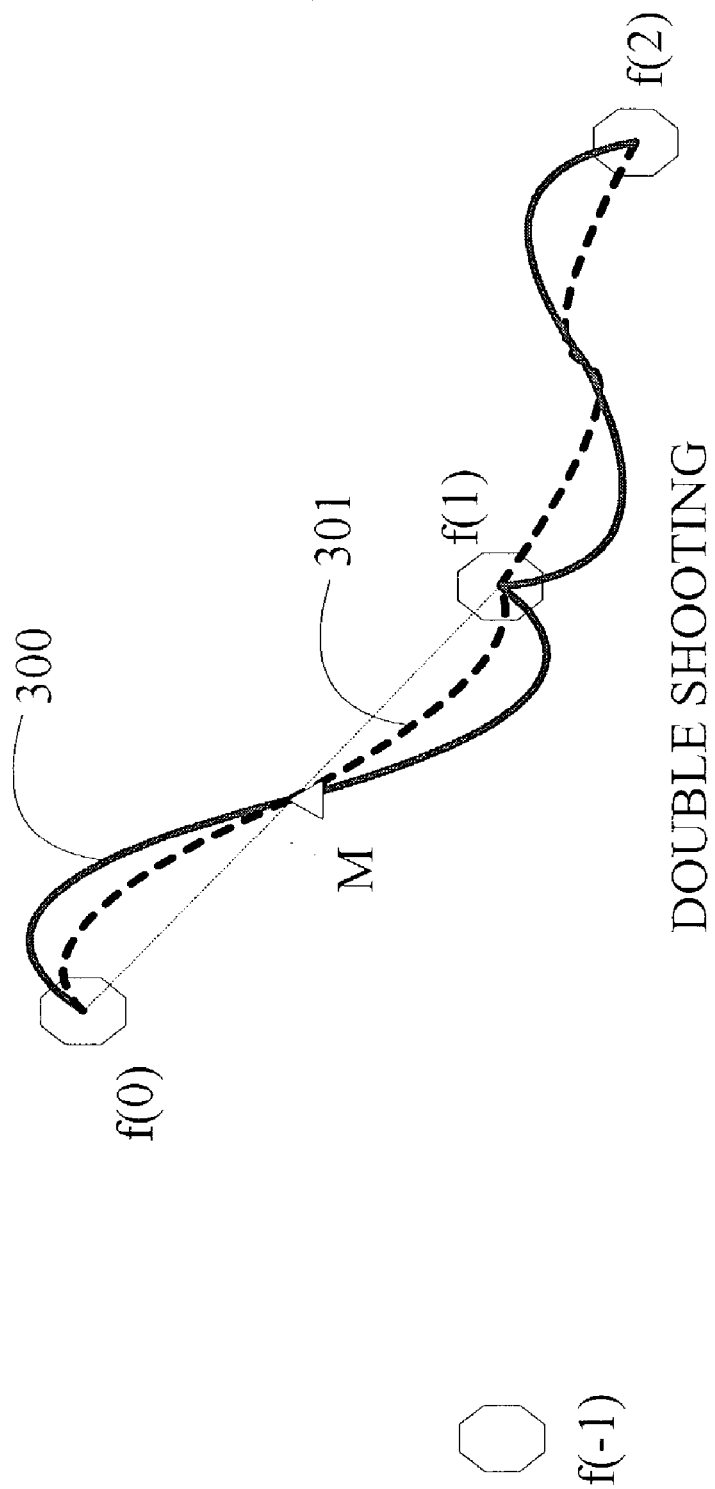
FIG. 3 is a behavior of the CTPSC scaling method with a small difference in the gain of the slope at the start and end source points for tweaking scaling result

FIG. 3 is a result of the CTPSC scaling method with small difference in gain of slope at the start and the end source points. This small difference in the gain of slope provides good scaling results. Curve 300 has a larger slope gain than that of curve 301, which results in a double shooting when crossing the point f(1). It is to be noted that this pattern in this particular example is not an edge of an object and therefore the existence of a double shooting will make the scaling result oscillate at the linear smoothing pattern, which will result in degradation of the picture quality. Although double shooting generally increases image sharpness which is advantageous, in this situation, it is to be prevented. Therefore a little gain of slope is suitable for this reason to reduce the oscillation to as small as possible like the linear smoothing pattern curve 301. A linear smoothing pattern means the pattern decreases or increases gradually without sharp edges.

The cost estimation of the solution f(x) for both for $0 \leq x < 0.5$ and for $0.5 \leq x < 1$ is shown in Table 1 below. The cost is calculated based on the number of operations in the formula.

TABLE 1

|  | Parameter | Adder | Multiplier |
|---|---|---|---|
| $0 \leq x < 0.5$ | DG = [2f(0) − f(−1) − f(1)] G | 2 | 1 |
|  | a = 2[f(1) − f(0) −DG] | 2 | 0 |
|  | b = DG | 0 | 0 |
|  | c = f(0) | 0 | 0 |
|  | Total | 4 | 1 |
| $0.5 \leq x < 1$ | DG = [2f(0) − f(−1) − f(1)] G | 2 | 1 |
|  | a = 2[DG + f(0) − f(1)] | 2 | 0 |
|  | b = [4f(1) − 4f(0) − 3DG] | 3 | 0 |
|  | c = [DG − f(1) + 2f(0)] | 2 | 0 |
|  | Total | 9 | 1 |

The cost is high in the worst case for $0.5 \leq x < 1$ which needs 9 adders. For this reason, a coordinate transfer skill to reduce the cost is, for example, further introduced.

A Z coordinate is introduced, in which the coordinate X is transformed to the Z coordinate as follows:

$$F(z) = az^2 + bz + c,\qquad \text{Eq. 18}$$

$$F'(z) = 2az + b;\qquad \text{Eq. 19}$$

for $0.5 \leq x < 1$ $$Z(z) = X(x) - 1,\qquad \text{Eq. 20}$$

that is, $$Z(0) = X(1).\qquad \text{Eq. 21}$$

$$Z(-0.5) = X(0.5),\qquad \text{Eq. 22}$$

where the initial conditions for D, M, f(1), and a gain factor G are $$F(0) = c = f(1),\qquad \text{Eq. 23}$$

$$F'(0) = b = [2f(0) - f(-1) - f(1)]G = DG,\qquad \text{Eq. 24}$$

$$F(-0.5) = 0.25a - 0.5b + c = M = 0.5[f(0) + f(1)].\qquad \text{Eq. 25}$$

Thus, it is obtained that $$F(z) = 2[f(0) - f(1) + DG]z^2 + (DG)z + f(1).\qquad \text{Eq. 26}$$

The cost estimation in this manner is shown in Table 2.

Table 2

TABLE 2

|  | Parameter | Adder | Multiplier |
|---|---|---|---|
| $0.5 \leq x < 1$ | DG = [2f(0) − f(−1) − f(1)]G | 2 | 1 |
|  | a = 2[f(0) − f(1) + DG] | 2 | 0 |
|  | b = DG | 0 | 0 |
|  | c = f(1) | 0 | 0 |
|  | Total | 4 | 1 |

By applying a simple Z transformation to the equation, the number of adders is brought down to 4 from its original 9. However, due to the fact that true color requires tree separate R, G, B channels in a display system, this means that three sets of f(x) are needed. Since x denotes the position, the three sets are identical and therefore only one set of f(x) will be discussed. The transformation for condition $0.5 \leq x < 1$ is just a bit mapping operation because X(x)−1 is rather costless.

Thus, the Z transformed CTPSC scaling method can reduce the adder count from 9 to 4 for the calculation of the parameters a, b, and c. If it is cut down for the number of multipliers by replacing with shifters (i.e. 4×, 2×, 1×, 0.5×, 0.25×), the cost will become totally dependent on the adder count. This will enhance the importance of Z transformation, which reduces by 4/9 of adder counts.

Figure 4:
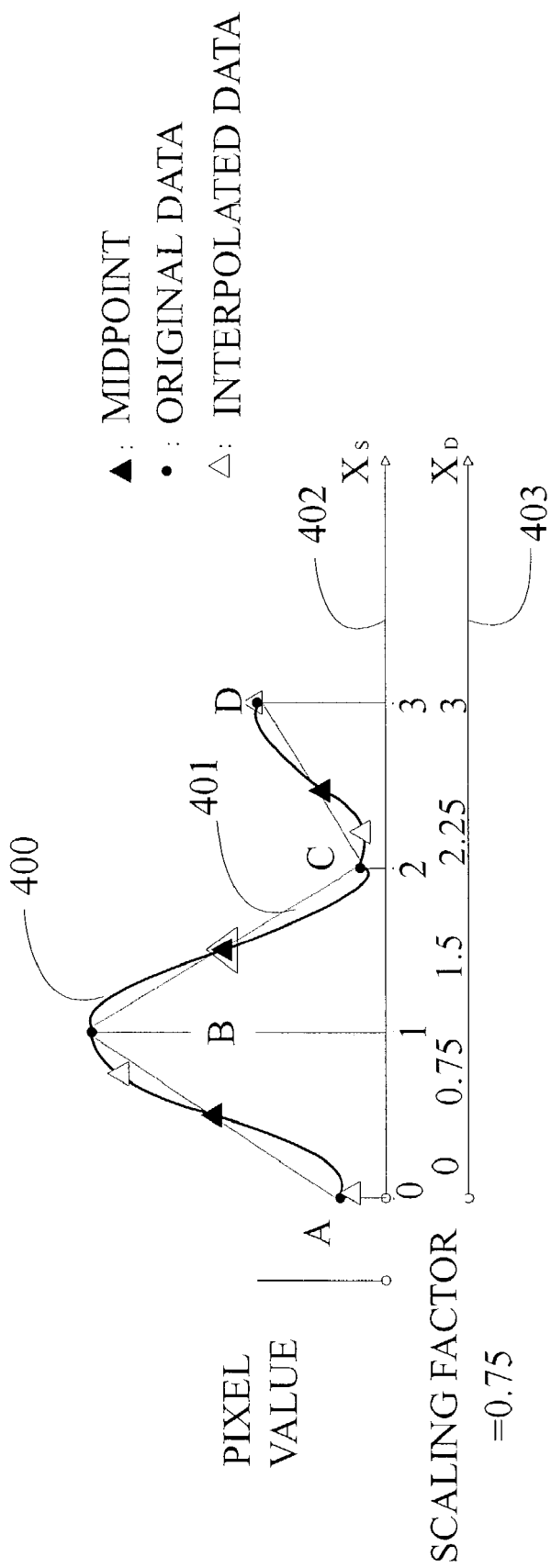
FIG. 4 is an example of scaling with a scaling factor of 0.75 using the CTPSC scaling method of the present invention.

FIG. 4 shows the implementation CTPSC method of the present invention. Curve 400 is the curve using CTPSC method and curve 401 is the Bilinear curve shown for comparison reasons. $X_S$ 402 is the source data location and $X_D$ 403 is the destination interpolation data location. For zoom and shrink purposes, the procedure is as follows:

a. $X_S$ denotes the position coordinate, with original data $D_0$, $D_1$, $D_2$, $D_3$... DM for x=0,1,2,3 ... M.
  b. A scaling factor generator generates the interpolation location $X_D$. The scaling factor is determined by (input resolution)/(output resolution), and is 0.75 in this preferred embodiment as an example. A condition of scaling factor <1 refers to an up scaling case and a condition of scaling factor >1 refers to a down scaling case. For interpolation points x is located between the coordinate x=N to x=N+1.

It is given that $f(-1)=D_{N-1}$, $f(0)=D_N$, $f(+1)=D_{N+1}$, and x=0 . . . 1 (truncate the integer part N).
c. For $0 \leq x < 0.5$, $$f(x)=2[f(1)-f(0)-DG]x^2+(DG)x+f(0). \quad \text{Eq. 27}$$

d. For $0.5 \leq x < 1$, $$f(x)=2[DG+f(0)-f(1)]x^2+[4f(1)-4f(0)-3DG]x+[DG-f(1)+2f(0)]. \quad \text{Eq. 28}$$

Or, the Z transform of Z(z)=X(x)−1 is applied to get $$F(z)=2[f(0)-f(1)+DG]z^2+(DG)z+f(1) \quad \text{Eq. 29}$$

for the range x=0.5 . . . 1 changing to z=−0.5 . . . 0.
e. f(x) or F(z) are obtained, where
f(x) and F(z) denote the data after scaling or shrinking at point x.

Figure 5:
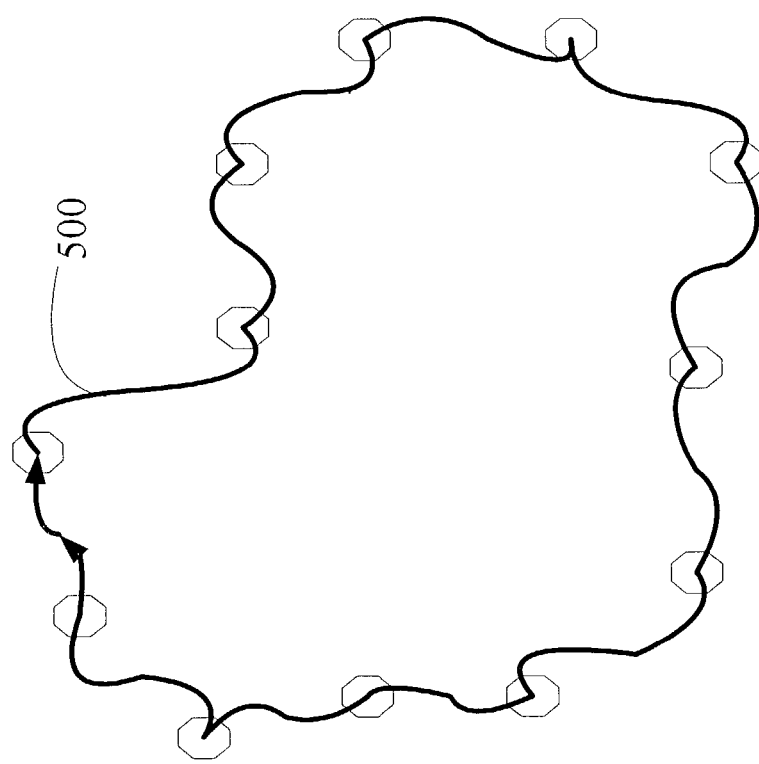
FIG. 5 is an application of a 2D-object shape using the single slope CTPSC curve of the present invention.

FIG. 5 is the application of the single slope CTPSC curve of the present invention on a 2D shape object used by a finder. The outline of any 2D shape object can be obtained by connecting all the reference source points together. The sample points are the selected shape control points used to form the curve 500 which is the boundary of a 2D shape object using the CTPSC method.

In conclusion, the CTPSC scaling method of the present invention is low cost and high performance in scaling compared to the usual conventional Cubic method or the B-Spline method. By defining the slope and gain DG of both the start and the end points, the scaling quality can be controlled and adjusted. The computation, processing, and storage requirements in the present invention may be greater than that of Bilinear method by a small amount, but are considerably less than that of Cubic or B-Spline methods because the CTPSC scaling method requires only three reference points. Furthermore, a sharper and crispier image is achieved by scaling up a source image compared to the blurry image output using the Bilinear method. It is very essential during vertical scaling that the whole line of image data must be stored as a whole in the line buffer. Typically, when more reference points are involved, it means that the more line buffers are required. With respect to this concern of line buffer in the invention, the CTPSC method of the present invention only can perform scaling by requiring only a small number of three line buffers with respect to three reference points. The present invention is excellent for use in many applications, for example, in scaling of graphic, image, video, audio, or polygon curve fitting applications, moving tracking analysis, data analysis, or finder for object 2D shape or 3D surfaces in graphic areas. Further still, the method of the invention can be implemented in a circuit or a system to perform scaling.

Figure 6:
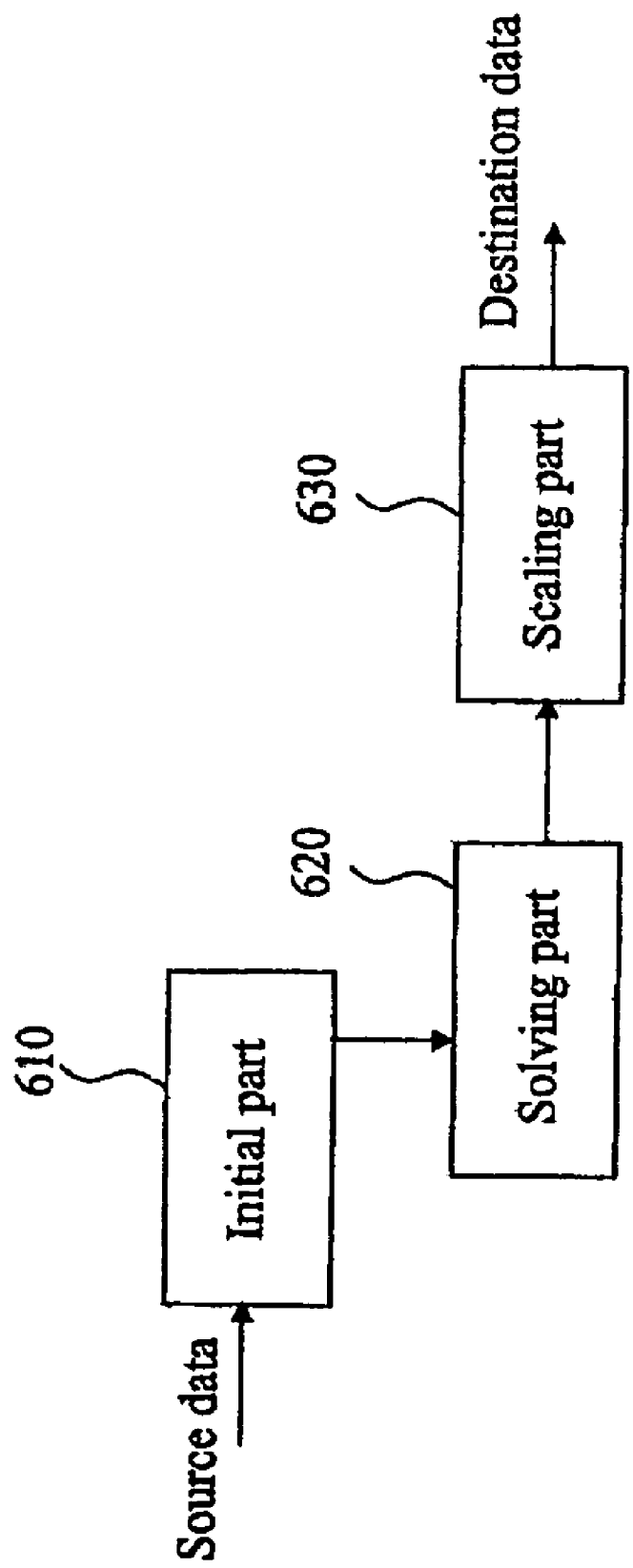
FIG. 6 shows a scaling circuit according to an embodiment of the present invention.

From the circuit or the system point of view, the scaling can be, for example, divided into three parts. Please refer to FIG. 6. FIG. 6 shows a scaling circuit according to an embodiment of the present invention. An initial part 610 is used to set the initial condition by setting a midpoint 0.5 with a quantity of f(0.5)=[f(0)+f(1)]/2 and f'(0)=f'(1)=DG. D is a slope of [2f(0)−f(−1)−f(1)] and G is a gain factor to adjust the slope. A solving part 620 is used to solve the function f(x). A constrain on the f(x) is set by passing through the points of 0, 0.5, and 1 by quantities of f(0), f(0.5), and f(1). The solving part solves the coefficients of a, b, and c for f(x) by a range of $0 \leq x < 0.5$ and a range of $0.5 \leq x < 1$, so that the f(x) is symmetric or substantially symmetric to the midpoint. A scaling part 630 is used to scale the source data based on the resolution between the input data and the out put data, wherein the solved f(x) is used for interpolation.

It will be apparent to those skilled in the art that various modifications and variations can be made to the structure and method of the present invention without departing from the scope or spirit of the present invention. In view of the foregoing description, it is intended that the present invention covers modifications and variations of this invention provided they fall within the scope of the following claims and their equivalents.

What is claimed is:

1. A method for scaling a source data to a destination data, implemented in a scaling device to provide the destination data in display or analysis, wherein three reference points of the source data denoted as −1, 0, and 1 by quantities of f(−1), f(0), and f(1) are used, in which f(x) is used to describe the destination data with a range between the points of 0 and 1, and f(x) is a quadratic form with three coefficients a, b, c for $f(x)=ax^2+bx+c$, the method comprising:

setting an initial condition comprising setting a midpoint 0.5 with a quantity of f(0.5)=[f(0)+f(1)]/2 and f'(0)=f'(1)=DG, wherein D is a slope of [2f(0)−f(−1)−f(1)], and G is a gain factor to adjust the slope;

applying a constraint on the f(x) by passing through the points of 0, 0.5, and 1 by quantities of f(0), f(0.5), and f(1);

solving the coefficients of a, b, and c for f(x) by a range of $0 \leq x < 0.5$ and a range of $0.5 \leq x < 1$, so that the f(x) is symmetric or substantially symmetric to the midpoint, wherein the solved function f(x) is used to generate the destination data to be displayed or analyzed in an application unit.

2. The method of claim 1, wherein the f(x) is set to be $f(x)=2[f(1)-f(0)-DG]x^2+(DG)x+f(0)$ for $0 \leq x < 0.5$;
and $f(x)=2[DG+f(0)-f(1)]x^2+[4f(1)-4f(0)-3DG]x+[DG-f(1)+2f(0)]$ for $0.5 \leq x < 1$.

3. The method of claim 2, wherein the coefficients of a, b, and c for the f(x) is based on the equations comprising:

for $0 \leq x < 0.5$, $f(0)=c$, $f'(0)=b=[2f(0)-f(-1)-f(1)]G=DG$, $f(0.5)=0.25a+0.5b+c=0.5[f(0)+f(1)]=M$; and for $0.5 \leq x < 1$ $f(1)=a+b+c$, $f'(1)=2a+b=[2f(0)-f(-1)-f(1)]G=DG$ $f(0.5)=0.25a+0.5b+c=0.5[f(0)+f(1)]=M$.

4. The method as claimed in claim 1, wherein the function is determined by setting $f(x)=2[f(1)-f(0)-DG]x^2+(DG)x+f(0)$ for $0 \leq x < 0.5$;
and $F(z)=2[f(0)-f(1)+DG]z^2+(DG)z+f(1)$ for $-0.5 \leq z < 0$
wherein Z-transform of Z(z)=X(x)−1 is applied.

5. The method as claimed in claim 4, further comprising solving the coefficients a, b, and c of the function f(x) based on the following equations:

for $0 \leq x < 0.5$:

$f(0)=c$ $f'(0)=b=[2f(0)-f(-1)-f(1)]G=DG$ $f(0.5)=0.25a+0.5b+c=0.5[f(0)+f(1)]$; and for $-0.5 \leq z < 0$ $F(0)=c=f(1)$ $F'(0)=b=[2f(0)-f(-1)-f(1)]G=DG$ $F(-0.5)=0.25a-0.5b+c=M=0.5[f(0)+f(1)]$.

6. A scaling circuit, used to scale input data and export output data, wherein the circuit employs a curve function f(x) to describe the output data, wherein the f(x) is determined by choosing three reference points of the source data denoted as −1, 0, and 1 by quantities of f(−1), f(0), and f(1) for use, wherein the f(x) is used to describe the output data with a range between the points of 0 and 1, and f(x) is a quadratic form of with three coefficients a, b, c for f(x)=ax²+bx+c, the circuit comprising:
a initial circuit unit to set an initial condition comprising setting a midpoint 0.5 with a quantity of f(0.5)=[f(0)+f(1)]/2 and f'(0)=f'(1)=DG wherein D is a slope of [2f(0)−f(−1)−f(1)], and G is a gain factor to adjust the slope; and
a solving circuit part to solve the f(x) under a constraint on the f(x) by passing through the points of 0, 0.5, and 1 by quantities of f(0), f(0.5), and f(1), and solve the coefficients of a, b, and c for f(x) by a range of $0 \leq x < 0.5$ and a range of $0.5 \leq x < 1$, so that the f(x) is symmetric or substantially symmetric to the midpoint.

7. The scaling circuit of claim 6, wherein the f(x) is set to be $f(x)=2[f(1)-f(0)-DG]x^2+(DG)x+f(0)$ for $0 \leq x < 0.5$; and $f(x)=2[DG+f(0)-f(1)]x^2+[4f(1)-4f(0)-3DG]x+[DG-f(1)+2f(0)]$ for $0.5 \leq x < 1$.

8. The scaling circuit of claim 7, wherein the coefficients of a, b, and c for the f(x) is based on the equations comprising:

for $0 \leq x < 0.5$, $f(0)=c$, $f'(0)=b=[2f(0)-f(-1)-f(1)]G=DG$, $f(0.5)=0.25a+0.5b+c=0.5[f(0)+f(1)]=M$; and for $0.5 \leq x < 1$ $f(1)=a+b+c$, $f'(1)=2a+b=[2f(0)-f(-1)-f(1)]G=DG$ $f(0.5)=0.25a+0.5b+c=0.5[f(0)+f(1)]=M$.

9. The scaling circuit of claim 6, wherein the function is determined by setting $f(x)=2[f(1)-f(0)-DG]x^2+(DG)x+f(0)$ for $0 \leq x < 0.5$; and $F(z)=2[f(0)-f(1)+DG]z^2+(DG)z+f(1)$ for $-0.5 \leq z < 0$
wherein Z-transform of Z(z)=X(x)−1 is applied.

10. The scaling circuit of claim 9, further comprising solving the coefficients a, b, and c of the function f(x) based on the following equations:

for $0 \leq x < 0.5$:

$f(0)=c$ $f'(0)=b=[2f(0)-f(-1)-f(1)]G=DG$ $f(0.5)=0.25a+0.5b+c=0.5[f(0)+f(1)]$; and for $-0.5 \leq z < 0$ $F(0)=c=f(1)$ $F'(0)=b=[2f(0)-f(-1)-f(1)]G=DG$ $F(-0.5)=0.25a-0.5b+c=M=0.5[f(0)+f(1)]$.

11. A method for generating destination data samples f(x) in response to three source data samples f(−1), f(0) and f(1), the method being implemented in a scaling device to provide the destination data samples for display or analysis, wherein f(x) is generated for x in a range of $0 \leq x < 1$, said method comprising the steps of:
(a) generating a middle point sample f(0.5) by defining f(0.5)=[f(0)+f(1)]/2;
(b) fitting a quadratic equation of f(x)=ax²+bx+c to said source data samples f(0) and f(1) and said middle point sample f(0.5); and
(c) generating a resulting equation f(x)=2[f(1)−f(0)−DG]x²+(DG)x+f(0) for one subregion of $0 \leq x < 0.5$ and f(x)=2[DG+f(0)−f(1)]x²+[4f(1)−4f(0)−3DG]x+[DG−f(1)+2f(0)] for another subregion of $0.5 \leq x < 1$, wherein DG designates a slope at said source data samples f(0) and f(1) and is determined by said source data samples f(−1), f(0) and f(1), wherein the resulting equation f(x) is utilized to generate the destination data samples for display or analysis in an application unit.

12. The method as claimed in claim 11, further comprising;
(d) converting f(x)=2[DG+f(0)−f(1)]x²+[4f(1)−4f(0)−3DG]x+[DG−f(1)+2f(0)] for said another subregion of $0.5 \leq x < 1$ into F(z)=2[f(0)−f(1)+DG]z²+(DG)z+f(1) for $-0.5 \leq z < 0$, wherein Z-transform of Z(z)=X(x)−1 is applied.

13. The method as claimed in claim 11, wherein D is defined to be [2f(0)−f(−1)−f(1)] and G is a gain factor.

* * * * *